United States Patent [19]

Mori

[11] 4,426,137
[45] Jan. 17, 1984

[54] GAUSS TYPE PHOTOGRAPHIC LENS
[75] Inventor: Ikuo Mori, Kawasaki, Japan
[73] Assignee: Nippon Kogaku K.K., Tokyo, Japan
[21] Appl. No.: 345,364
[22] Filed: Feb. 3, 1982
[30] Foreign Application Priority Data Feb. 10, 1981 [JP] Japan .................................. 56-17404

[51] Int. Cl.³ .......................... G02B 7/04; G02B 9/42
[52] U.S. Cl. ...................................... 350/471; 350/255
[58] Field of Search ............... 350/470, 471, 464, 466, 350/467, 431, 428, 255

[56] References Cited

U.S. PATENT DOCUMENTS

| 2,503,789 | 4/1950 | Wood et al. | 350/255 |
| 2,537,912 | 1/1951 | Raiss | 350/470 |
| 3,815,974 | 6/1974 | Momiyama | 350/471 X |
| 3,884,557 | 5/1975 | Nakamura | 350/471 X |
| 4,057,329 | 11/1977 | Fleischman | 350/471 |
| 4,390,252 | 6/1983 | Mori | 350/471 |

*Primary Examiner*—John K. Corbin
*Assistant Examiner*—Scott J. Sugarman
*Attorney, Agent, or Firm*—Shapiro and Shapiro

[57] ABSTRACT

A Gauss type photographic lens comprises, in succession from the object side, a first lens component of positive refractive power fixed relative to the image plane, a second lens component of negative refractive power fixed relative to the image plane, a third lens component of negative refractive power movable relative to the image plane, and a fourth lens component of positive refractive power movable relative to the image plane. The third lens component and the fourth lens component are movable by different amounts in the same direction for focusing.

6 Claims, 5 Drawing Figures

GAUSS TYPE PHOTOGRAPHIC LENS

BACKGROUND OF THE INVENTION

1. Field of the Invention

This invention relates to the focusing system of a lens system, and particularly to a Gauss type photographic lens which can be focused by a simple construction.

2. Description of the Prior Art

With photographing lenses, except zoom lenses, it is usual that the entire lens system is integrally moved for focusing, and the entire lens system may be quite heavy. This holds true for standard photographic lenses, and particularly Gauss type photographic lenses used most often as the standard lenses of 35 mm single lens reflex cameras. In such lenses it is desired, of course, that the imaging performance for short distance objects not be deteriorated.

SUMMARY OF THE INVENTION

It is an object of the present invention to provide a Gauss type photographic lens which can be focused by movement of a portion thereof and yet maintains excellent imaging performance even for short distance objects.

The invention will become fully apparent from the following detailed description thereof taken in conjunction with the accompanying drawings.

BRIEF DESCRIPTION OF THE DRAWINGS

FIG. 1A showing the optical path in the infinity in-focus condition and

FIG. 1B showing the optical path in the in-focus condition at the distance $D_0 = 1.0$ m from an object to the image plane.

DESCRIPTION OF THE PREFERRED EMBODIMENT

Figure 1A:
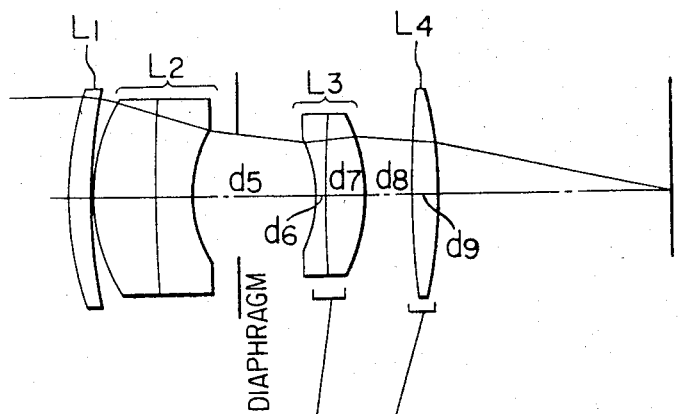
FIGS. 1A and 1B are illustrations of an embodiment of the present invention.
Figure 1B:
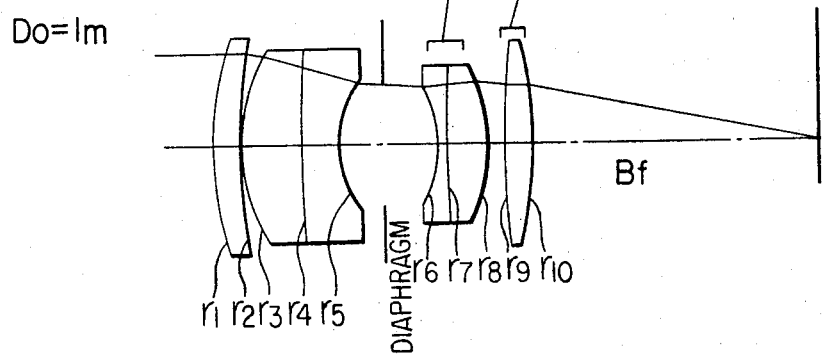

The construction of the present invention is based on the so-called rearward group movable lens covered by applicant's Japanese Patent Application No. 101976/1979 (U.S. application Ser. No. 171,003 now U.S. Pat. No. 4,390,252). Describing it by reference to FIGS. 1A and 1B showing the construction of an embodiment of the present invention, it is a Gauss type photographic lens which comprises, in succession from the object side, a first lens component $L_1$ which is a positive meniscus lens having its convex surface facing the object side, a second lens component $L_2$ which is a meniscus lens having its convex surface facing the object side, a diaphragm, a third lens component $L_3$ which is a meniscus lens having its convex surface facing the image side, and a fourth lens component $L_4$ which is a positive lens, the first and second lens components being fixed relative to the image plane and the third and fourth lens components being movable to thereby effect focusing. More specifically, to form the lens for an object at a shorter distance from the image plane, the fourth lens component is moved toward the object side while, at the same time, the third lens component is also moved toward the object side (FIG. 1B), whereby focusing is effected and aberration correction at a short distance is effected.

Generally, in a Gauss type lens, when the rearmost fourth lens component $L_4$ is moved toward the object side to reduce the space $d_8$ between the third lens component $L_3$ and the fourth lens component $L_4$ spherical aberration and astigmatism tend to vary in the negative sense. The amount of this variation sharply increases when the photographic magnification exceeds the vicinity of 1/30. Of course, the reason for this is merely that the amount of axial movement of the rearward group lens necessary for focusing increases. Accordingly, as the object distance becomes shorter, the amount of movement of the focus, coupled with under-correction of spherical aberration, increases on the axis and great under-correction of astigmatism occurs off the axis, thus bringing about deterioration of the imaging performance.

In contrast, in the Gauss type lens of the present invention, it has been found that spherical aberration and astigmatism are varied in the positive sense by reducing the disphragm space $d_5$ between the second lens component $L_2$ and the third lens component $L_3$, and, more particularly, by moving the third lens component $L_3$ toward the object side simultaneously with the movement of the fourth lens component $L_4$, thereby chiefly correcting spherical aberration and astigmatism quite well. To a further advantage, the movement of the third lens component $L_3$ toward the object side substantially contributes to the axial movement of the fourth lens component $L_4$ which is the rearward group. This is because the sum of the amount of movement of the third lens component $L_3$ and the amount of movement of the fourth lens component $L_4$ corresponds to the actual amount of axial movement. Accordingly, in the system of the present invention, as compared with a system in which focusing is accomplished by moving only the fourth lens component $L_4$, the amount of variation in the air space $d_8$ just before the fourth lens component may be small, and, as a result, the influence on various aberrations becomes small.

In such Gauss type photographic lenses of the present invention, it is most effective in aberration correction that the amount of movement $\Delta L_3$ of the third lens component be about $\frac{1}{2}$ the amount of movement $\Delta L_4$ of the fourth lens component for focusing. It is desirable that the relation between the amount of variation $\Delta d_5$ in the diaphragm space, i.e., the space $d_5$ between the second lens component $L_2$ and the third lens component $L_3$, and the amount of variation $\Delta d_8$ in the space $d_8$ between the third lens component $L_3$ and the fourth lens component $L_4$ be $0.1 \Delta d_8 < \Delta d_5 < 1.5 \Delta d_8$, where $\Delta d_5 = \Delta d_8$ when $\Delta L_3 = \frac{1}{2} \cdot \Delta L_4$.

Also, in the present invention, the air space between the third lens component and the fourth lens component must be made great in the in-focus condition at infinity, and, therefore, it is desirable in aberration correction for an object at infinity that the center thickness $(d_6 + d_7)$ of the third lens component be smaller than the sum of the space $d_8$ between the third lens component and the fourth lens component and the center thickness $d_9$ of the fourth lens component, namely, that $(d_6+d_7)<(d_8+d_9)$. This is intended to correct, by decreasing the center thickness of the third lens component, astigmatism which tends to become excessively great in the positive sense when the air space just before the fourth lens component is made great, and it is an important condition for good correction at the image plane.

An embodiment of the present invention will hereinafter be described. FIG. 1A is an illustration of a lens of the invention showing the optical path in the infinity in-focus condition of the embodiment, and FIG. 1B is an illustration of the optical path in the short distance in-focus condition at the distance $D_0=1.0$ m from the object to the image plane.

The numerical data of the present embodiment will be shown below. In the table below, $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, \ldots$ and $\nu_1, \nu_2, \ldots$ represent the refractive indices and Abbe numbers, respectively, of the respective lenses for the d-line. In this table, the variable spaces and back focal length in the short distance in-focus condition, when the distance $D_0$ from the object to the image plane is $D_0=1$ m, are also shown.

| Focal length f = 100 | F-number 2.5 | Angle of view 29.5° | |
|---|---|---|---|
| $r_1 = 65.58$ | $d_1 = 5.53$ | $n_1 = 1.7481$ | $\nu_1 = 52.06$ |
| $r_2 = 165.4$ | $d_2 = 0.12$ | | |
| $r_3 = 37.47$ | $d_3 = 12.53$ | $n_2 = 1.67025$ | $\nu_2 = 57.58$ |
| $r_4 = 463.86$ | $d_4 = 7.25$ | $n_3 = 1.62004$ | $\nu_3 = 36.35$ |
| $r_5 = 23.59$ | $d_5 = 25.799$ | | |
| $r_6 = -28.6$ | $d_6 = 1.84$ | $n_4 = 1.75692$ | $\nu_4 = 31.7$ |
| $r_7 = 479.12$ | $d_7 = 7.62$ | $n_5 = 1.744$ | $\nu_5 = 45.06$ |
| $r_8 = -38.98$ | $d_8 = 9.828$ | | |
| $r_9 = 229.12$ | $d_9 = 5.53$ | $n_6 = 1.79668$ | $\nu_6 = 45.52$ |
| $r_{10} = -82.33$ | Bf = 49.174 | | |
| When | $d_5 = 20.176$ | $\Delta d_5 = 5.623$ | |
| $D_0 = 1m$ | $d_8 = 4.205$ | $\Delta d_8 = 5.623$ | |
| | Bf = 60.42 | | |

Figure 2A:
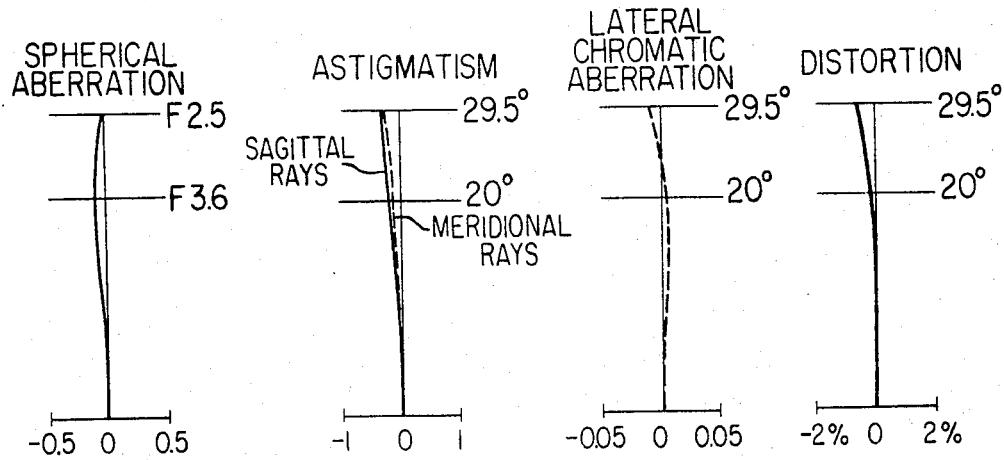
FIGS. 2A, B and C illustrate various aberrations in the embodiment of the present invention, FIG. 2A showing the various aberrations in the infinity in-focus condition, FIG. 2B showing the various aberrations in the in-focus condition at the distance $D_0 = 1$ m from an object to the image plane, and FIG. 2C showing the various aberrations when focusing has been accomplished for the same short distance object by moving only a fourth lens component.
Figure 2B:
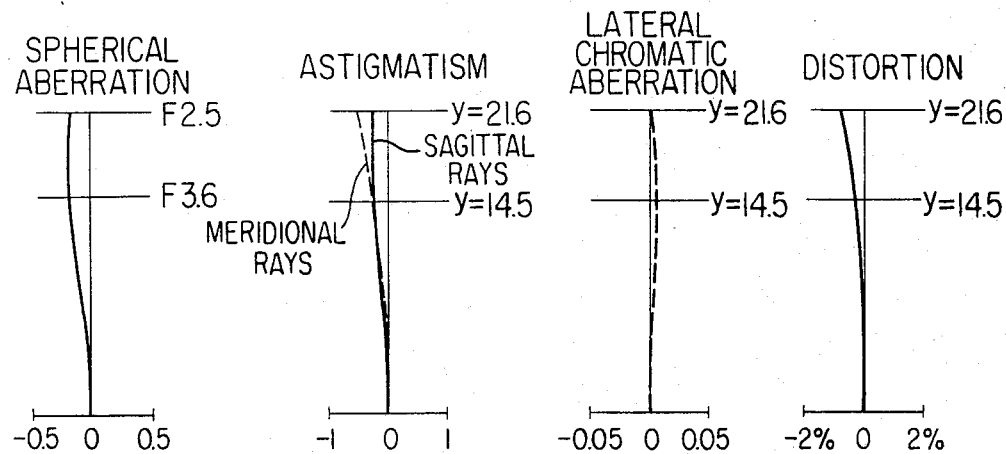
Figure 2C:
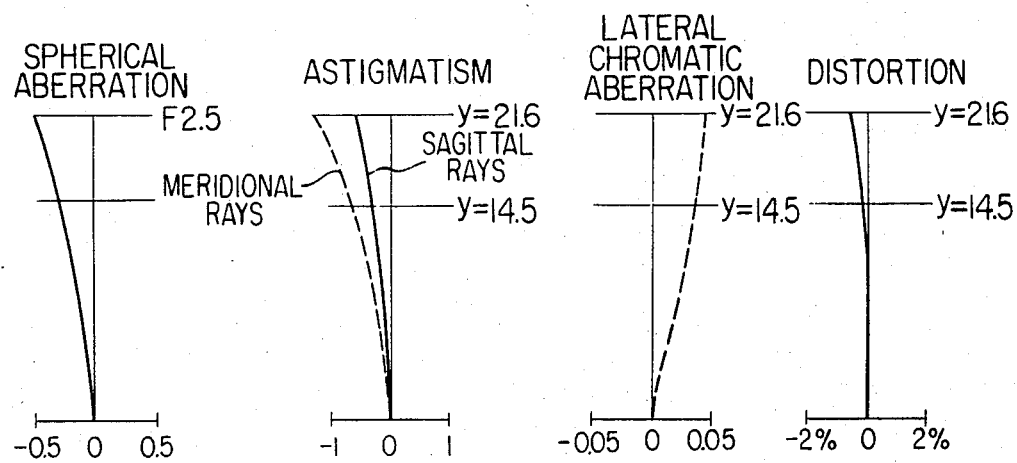

The various aberrations in the infinity in-focus condition in the present embodiment are shown in FIG. 2A, and the various aberrations in the in-focus condition at the distance $D_0=1.0$ m from the object to the image plane are shown in FIG. 2B. For reference, the various aberrations when focusing has been accomplished by moving only the fourth lens component L₄ relative to the same short distance object are shown in FIG. 2C. With such movement of the fourth lens component, the space $d_8$ becomes 0.03.

From the comparison of FIGS. 2A and 2B, it will be seen that even for focusing at a very short distance, aberration correction has been achieved very well, as in the case of focusing at infinity. Also, if FIG. 2B is compared with FIG. 2C, it will be apparent that the construction of the present invention is much more effective in aberration correction.

While in the present embodiment, the second lens component, which is a negative meniscus lens, is comprised of a cemented lens, it is of course possible that this component, as known in a modified Gauss type lens, be comprised of a positive meniscus lens and a negative meniscus lens by separating their cemented surfaces.

According to the present invention, as described above, short distance focusing is accomplished by the movement of only the rearward portion of the Gauss type lens, and, moreover, deterioration of the imaging performance for such focusing is reduced and better photography at shorter distances becomes possible.

I claim:

1. A Gauss type photographic lens for forming an image of an object at a predetermined image plane comprising, in succession from the object side, a first lens component of positive refractive power including a positive meniscus lens having its convex surface facing the object side and being disposed at a fixed distance from the image plane, a second lens component of negative refractive power including a positive lens and a negative lens and being disposed at a fixed distance from the image plane, a third lens component of negative refractive power including a negative lens and a positive lens and being disposed movably along the optical axis relative to the image plane, and a fourth lens component of positive refractive power including a positive lens and being disposed movably along the optical axis relative to the image plane, said photographic lens being constructed so that focusing thereof is effected by movement of both said third and fourth lens components, but by different amounts, whereby improved aberration correction for short distance focusing is achieved.

2. A Gauss type photographic lens according to claim 1, wherein said third lens component and said fourth lens component move toward an object when focusing to shorter distances is effected, and the amount of movement of said fourth lens component is greater than that of said third lens component.

3. A Gauss type photographic lens according to claim 2, which satisfies the following condition:

$$0.1\Delta d_8 < \Delta d_5 < 1.5\Delta d_8$$

where $\Delta d_5$ is the amount of variation in the space between said second lens component and said third lens component, and $\Delta d_8$ is the amount of variation in the space between said third lens component and said fourth lens component.

4. A Gauss type photographic lens according to claim 2, wherein the amount of movement of said third lens component is about ½ of the amount of movement of said fourth lens component.

5. A Gauss type photographic lens comprising, in succession from the object side, a first lens component of positive refractive power fixed relative to the image plane, a second lens component of negative refractive power fixed relative to the image plane, a third lens component of negative refractive power movable relative to the image plane, and a fourth lens component of positive refractive power movable relative to the image plane, said third lens component and said fourth lens component being movable by different amounts in the same direction for focusing, and wherein the sum of the air space between said third lens component and said fourth lens component and the center thickness of said fourth lens component is greater than the center thickness of said third lens component.

6. A Gauss type photographic lens according to claim 5, wherein numerical data are as follows:

| Focal length f = 100 | F-number 2.5 | Angle of view 29.5° | |
|---|---|---|---|
| $r_1 = 65.58$ | $d_1 = 5.53$ | $n_1 = 1.7481$ | $\nu_1 = 52.06$ |
| $r_2 = 165.4$ | $d_2 = 0.12$ | | |
| $r_3 = 37.47$ | $d_3 = 12.53$ | $n_2 = 1.67025$ | $\nu_2 = 57.58$ |
| $r_4 = 463.86$ | $d_4 = 7.25$ | $n_3 = 1.62004$ | $\nu_3 = 36.35$ |
| $r_5 = 23.59$ | $d_5 = 25.799$ | | |

-continued

Focal length f = 100  F-number 2.5  Angle of view 29.5°

| | | | |
|---|---|---|---|
| $r_6 = -28.6$ | $d_6 = 1.84$ | $n_4 = 1.75692$ | $\nu_4 = 31.7$ |
| $r_7 = 479.12$ | $d_7 = 7.62$ | $n_5 = 1.744$ | $\nu_5 = 45.06$ |
| $r_8 = -38.98$ | $d_8 = 9.828$ | | |
| $r_9 = 229.12$ | $d_9 = 5.53$ | $n_6 = 1.79668$ | $\nu_6 = 45.52$ |
| $r_{10} = -82.33$ | $Bf = 49.174$ | | |
| When | $d_5 = 20.176$ | $\Delta d_5 = 5.623$ | |
| $D_0 = 1m$ | $d_8 = 4.205$ | $\Delta d_8 = 5.623$ | |

-continued

Focal length f = 100  F-number 2.5  Angle of view 29.5°

$Bf = 60.42$ where $r_1, r_2, r_3, \ldots$ represent the radii of curvature of the successive lens surfaces from the object side, $d_1, d_2, d_3, \ldots$ represent the center thicknesses and air spaces of the respective lens components, $n_1, n_2, \ldots$ and $\nu_1, \nu_2, \ldots$ represent the refractive indices and Abbe numbers, respectively, of the respective lens components for d-line.

* * * * *